United States Patent [19]

Spencer

[11] Patent Number: 4,527,804
[45] Date of Patent: Jul. 9, 1985

[54] SEALING OF ELECTRICAL CABLE JOINTS, EQUIPMENT HOUSINGS, OR THE LIKE

[75] Inventor: Herbert J. C. Spencer, Ascot, England

[73] Assignee: Telspec Limited, Rochester, England

[21] Appl. No.: 630,583

[22] Filed: Jul. 10, 1984

[30] Foreign Application Priority Data

Jul. 19, 1983 [GB] United Kingdom ................ 8319497
Aug. 17, 1983 [GB] United Kingdom ................ 8322096

[51] Int. Cl.³ .................... F16J 15/00; H02G 15/28; G01M 3/04
[52] U.S. Cl. .......................................... 277/1; 277/2; 277/3; 277/167.5; 174/11 R; 285/93; 73/46
[58] Field of Search ............................... 277/1–3, 277/9, 167.5, 237, DIG. 7; 174/11 R, 11 BH; 285/93; 73/46, 49.8

[56] References Cited

U.S. PATENT DOCUMENTS

| 1,821,866 | 9/1931 | Wilson | 277/167.5 |
|---|---|---|---|
| 2,493,152 | 1/1950 | Malcolm | 277/2 X |
| 3,141,685 | 7/1964 | Watts | 285/93 |
| 4,019,371 | 4/1977 | Chaplin et al. | 73/46 |
| 4,040,289 | 8/1977 | Clark et al. | 73/46 |
| 4,295,653 | 10/1981 | Coles | 277/2 |
| 4,410,186 | 10/1983 | Pierce | 277/2 |
| 4,460,181 | 7/1984 | Araoka | 277/2 X |

FOREIGN PATENT DOCUMENTS 2824175 12/1979 Fed. Rep. of Germany .......... 73/46
58-77968 5/1983 Japan ........................ 277/3

Primary Examiner—Robert S. Ward
Attorney, Agent, or Firm—Berman, Aisenberg & Platt

[57] ABSTRACT

A method of forming and testing a fluid tight seal comprises placing a sealing ring between two members between which the seal is to be formed, either the sealing ring or the respective members being so shaped and arranged that lines of contact are formed between the sealing ring and the respective members between which there are continuous grooves or channels between the sealing ring and the respective member. By establishing a pressure difference between the continuous channels and the ambient atmosphere, the integrity of the seal can be tested by monitoring any fluid flow to or from the closed groove or channel. A single source of fluid pressure may be coupled to both grooves or channels via a union in one of the members and one or more transverse bores in the sealing ring. The source of fluid pressure may comprise a suction pump in the form of a spring loaded bellows, and may incorporate means for registering a deviation of the bellows from a position of equilibrium, when coupled to the union, in response to leakage of the seal.

7 Claims, 7 Drawing Figures

SEALING OF ELECTRICAL CABLE JOINTS, EQUIPMENT HOUSINGS, OR THE LIKE

BACKGROUND OF THE INVENTION

A common problem when providing electrical cables and equipment housings which are to be located underground is how to ensure that joints between cables and between cables and housings are perfectly sealed against the ingress of water and water vapour. The problem has become more severe since the use of cables with polyethylene sheaths has become widespread. These are more difficult to seal to each other and to housing entry glands than cables with lead sheaths for which conventional plumbing techniques were effective. The standard of integrity of the sealing of cables and housings required is very high because of the large number of seals which can exist in a system. Failure of any one seal can cause failure of the whole system.

Because of the difficulty of making perfect seals it is common practice to apply internal air pressure to both cables and housings. Leaks in them can then be detected by measuring the air flow in a dynamic system or the fall of pressure in a static system. These techniques are, however, expensive to implement, are not suitable for use with modern filled cables, do not give clear indications of the locations of leaks and are relatively insensitive requiring prolonged monitoring periods to detect small leaks.

Alternative methods of indicating the quality of seals of equipment housings are known in which the sealing members are duplicated in such a way as to enclose an air space between them. The air pressure in this space is raised relative to the atmosphere by an air pump and the pressure then monitored over a period by an air pressure gauge. Because the enclosed air space is smaller in volume than the whole housing the pressure falls more rapidly in the event of a leak than if the whole housing is pressurised and the time necessary to detect small leaks is reduced to a number of hours rather than days.

SUMMARY OF THE INVENTION

In accordance with the present invention, a reliable seal which can be treated in a few seconds is obtained by forming a single sealing member and the two cooperating parts in such a way that the sealing member makes contact with each part along two lines between which there are lines of no contact, forming a continuous groove. Bores are provided, in the sealing member and/or the cooperating parts, connecting the grooves to a union at which may be connected a combined source of air pressure and pressure change detector. The efficacy of the seals formed by the lines of contact between the sealing member and the cooperating parts is tested by applying between the union and the atmosphere a pressure differential, typically about 6 lbs per square inch, sealing the union and then monitoring the air pressure. Should any line seal be defective air will flow between the pressure change detector and the atmosphere through the grooves. Because the volume of air within the grooves is very small, and by designing the pressure change detector to also have a very small internal volume, a small leak will result in a rapid change in air pressure therein. Preferably the volume of the grooves is a few cubic centimeters, depending upon the size of the housing being sealed, and that of the detector less than one cubic centimeter, resulting in a detectable change of pressure occurring in less than five seconds for a very small leak.

A seal in accordance with the invention may be utilised to provide a seal between an electrical cable and an equipment housin.

A known method of connecting a cable to a housing makes use of an entry gland. The cable may first be sealed within the gland by means of the "shrink-down" technique. In this method part of the hole through the gland, which is made from an irradiated material, is initially moulded with an internal diameter less than that of the cable which is to pass through it. The hole is then opened up to a diameter sufficient to accept the cable while the material of the gland is hot and then is cooled down in the enlarged state. Application of heat after the cable has been passed through the gland results in the appropriate part of the gland shrinking on the cable to provide a tight fit. The effectiveness of the seal is usually increased by the use of a hot melt adhesive between the cable and the gland. To apply the invention to a seal of this type the seal construction as defined above may be applied between the entry gland and the housing.

In accordance with a further aspect of the invention, there is provided a single test device for use in the testing of seals as described above, which device both applies the required pressure differential between the seal under test and the atmosphere and also detects any subsequent change in the pressure differential thus giving warning of the presence of leaks.

The device comprises a body portion defining an orifice to be coupled to said space, a member movable with respect to said body portion to convert a mechanical force applied to said movable member into a fluid pressure applied at said orifice, means for biasing said movable member whereby, when said device is coupled to said space, said member adopts a position of equilibrium with the mechanical force applied thereto balanced by the fluid pressure prevailing within said space, and means coupled to said member for registering a deviation thereof from said position of equilibrium as an indication of fluid leakage.

Preferably, means is provided for latching said movable member in a cocked position, said latching means being manually triggerable to release said member for movement under the influence of said biasing means.

Advantageously, the said deviation registering means is coupled to said movable member by way of a lost motion friction coupling and is arranged to be restrained in a rest position against movement with said member until the latter has been triggered into said position of equilibrium. The deviation registering means may be in the form of the contact of an electrical switch, in which case the rest position thereof advantageously corresponds to an open position of the switch.

DETAILED DISCLOSURE OF PREFERRED EMBODIMENTS

Figure 1:
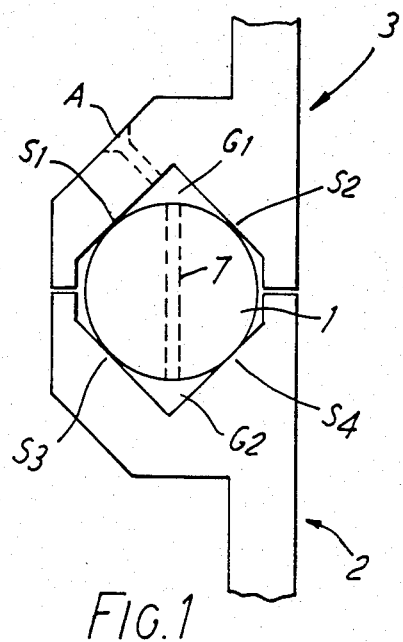
FIGS. 1-4 are respectively sectional elevations of several embodiments of housing seal in accordance with the invention.

Referring to FIG. 1 of the drawings, a seal arrangement comprises a resilient rubber ring of circular cross-section compressed between the base 2 and the cover 3 of a typical housing. Under compression, sealing contact areas are established along lines perpendicular to the drawing at S1, S2, S3 and S4. At the same time two V section grooves are formed at G1 and G2. Bore A in the cover provides a connection to G1 at one point. Similarly a bore in the base could provide direct connection to G2 but preferably, as shown, G2 is connected to G1 by a cross bore, or bores, 7 in the ring 1 so that both G1 and G2 are connected to bore A.

Figure 2:
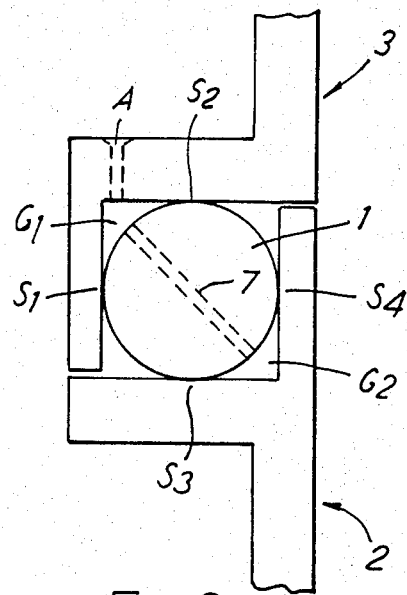

FIG. 2 shows alternative shapes for the base and cover of the housing which also result in the formation of four sealing areas and two grooves as described.

Figure 3:
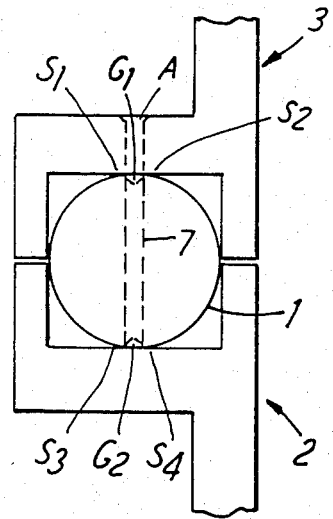

FIG. 3 shows an alternative method of forming the grooves in which the mating surfaces of the base 2 and cover 3 of the housing are flat and the grooves G1 and G2 are preformed in the sealing ring 1.

Figure 4:
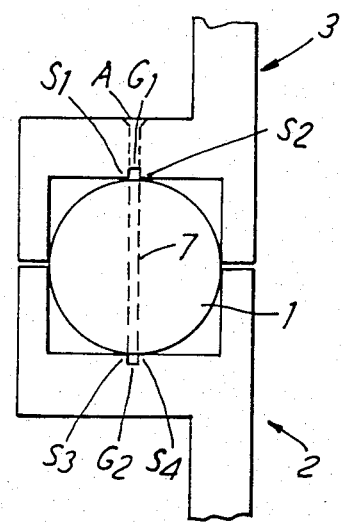

FIG. 4 shows a further alternative construction in which the sealing ring 1 has a circular section and the grooves G1 and G2 are preformed in the mating surfaces of the base 2 and cover 3.

It will be clear that these methods could be used in combination for one seal. Seals of the sections shown may be used for housings with circular or rectangular plan forms.

It will be appreciated that when a seal is effected by the method of the invention, two seals are formed in each case. If, however, after the seals have been tested, the union at which the testing device has been connected is left open one of the seals is rendered ineffective. Since the other seal will have been proved to be satisfactory this will be adequate in normal circumstances. If in exceptional circumstances the added security of two seals in series is desirable this may be realized by sealing the union, either by a screw plug or by a spring loaded valve.

Figure 5:
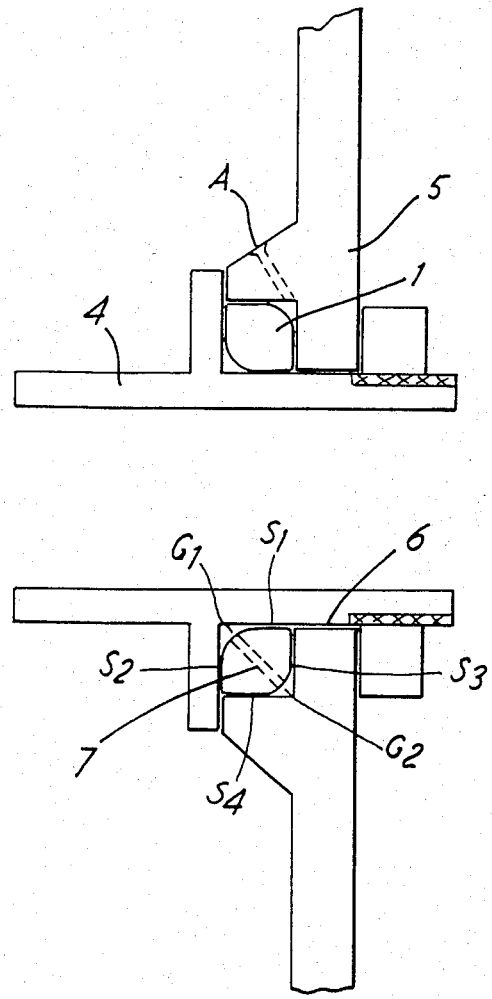
FIG. 5 is a similar view of a cable gland seal.

FIG. 5 shows how the invention may be applied to a cable gland seal. Sealing areas and grooves are formed as in the housing seal previously described. The cross-section shown for the sealing ring 1 ensures that the cross bore in it will always register with the grooves formed between a cable gland 4 and a housing 5 providing the entry hole 2. The cable gland 4 is retained in the hole 6 by means of a back nut 8 threaded thereon. An alternative method would be to provide two "0" rings in close proximity and to provide access to the limited air space between them. The efficacy of this seal can be tested as previously described. By applying the invention to each cable entry in turn and then to the cover/housing joint each seal can be tested and any effective seals rectified so that the security of the complete assembly can be assured.

While in all the above descriptions equipment housings have been referred to the housings may actually contain no equipment and then become in effect cable joints. By designing a housing to have a multiplicity of gland entries a number of cables can be jointed together.

Figure 6:
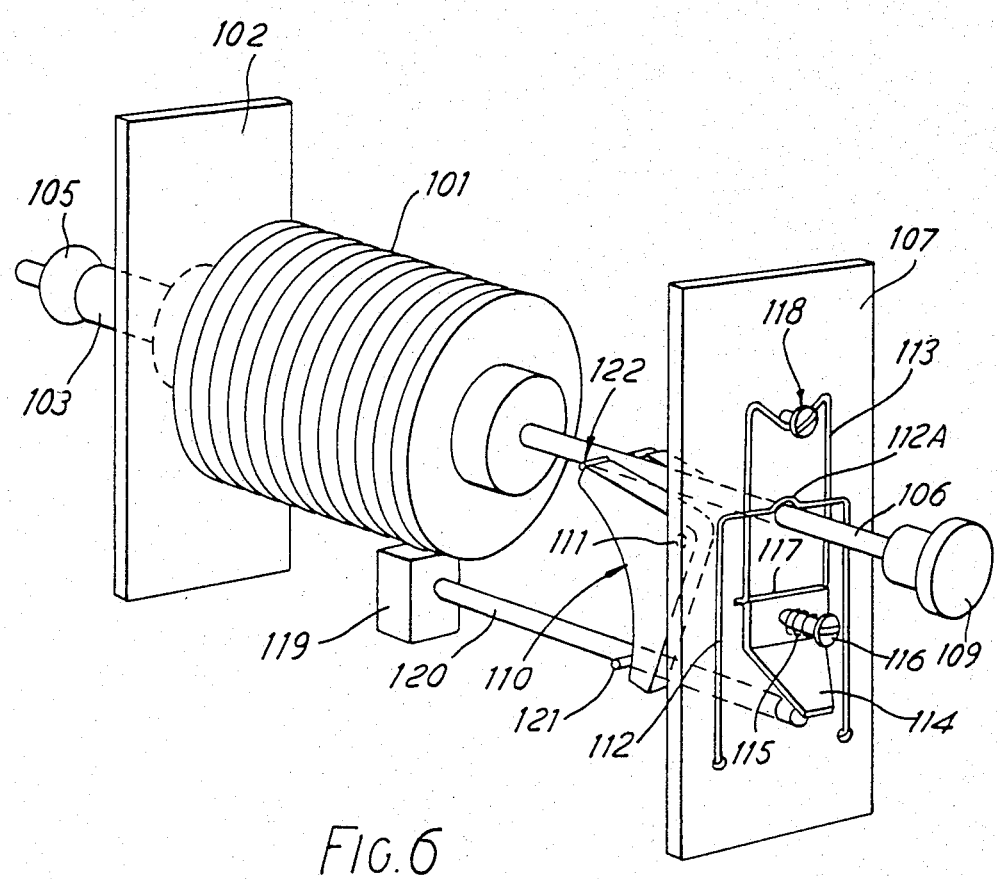
FIG. 6 is a diagrammatic perspective view of one embodiment of device according to the invention for use in testing seals as shown in FIGS. 1-5.
Figure 7:
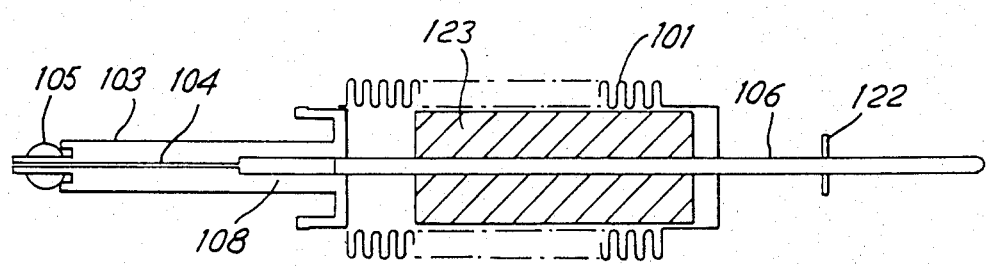
FIG. 7 is a longitudinal cross-section of part of the device of FIG. 6.

Referring to FIGS. 6 and 7 of the drawings, one embodiment of device for testing the seals described above comprises a flexible metal bellows member 101 of well known type which can be compressed against its own inherent spring characteristics, but which will restore to its original length when released.

The bellows member 101 is rigidly fixed at the left-hand end as viewed in FIG. 6 to a frame 102 of the complete device. At this end the bellows is hermetically sealed to an extension probe 103 through which there is a fine bore 104. The tip of the probe is equipped with a spherical resilient sealing member 105 which makes a leakproof connection to the union A of a seal as described above.

A rod 106 is sealed into the right-hand end of the bellows 101 and runs in a bearing in the other end frame 107 of the device. The rod passes through the length of the bellows to locate in a bearing 108 within the probe. At the right-hand end of the rod 106 there is a knob 109 by means of which the bellows 101 can be compressed. The arrangement of the bearings for the rod 106 ensures that the bellows may be compressed and released in a controlled manner with a minimum of opposing frictional forces.

A spring-loaded latch 110 turning about a pivot 111 in its right-hand upper corner secures the bellows in the fully compressed position. FIG. 6 illustrates this position.

A wire contact spring 112 is loosely fastened to the right-hand frame 107 with its horizontal portion 112A resting lightly upon the bellows rod 106. The spring is free to move to and fro with the bellows rod subject to limits set by the frame of the device and a reset spring 113 described below.

A contact reset lever 114, extended by the reset spring 113, is also fastened to the right-hand frame 107 of the device. It is flexibly mounted at its lower end by a coil spring 115 and screw 116 and rocks about a pivot 117. The spring and pivot relationship is such that the lever rocks to move the reset spring 113 away from the end frame 107 subject to the constraint of the head of an adjusting screw 118.

The right-hand end frame 107 of the device is made of an insulating material so that the contact spring 112 and the reset spring 113 are electrically isolated from each other except when they actually touch. To ensure a good electrical contact when they do touch under the influence of very small forces the contacting surfaces of the springs are preferably plated with gold.

A trigger 119 and associated operating rod 120 are arranged so that a cross-pin 121 in the rod can engage with the latch 110 and the extremity of the rod 120 can engage with the reset lever 114 through an aperture in the end frame 107 when the trigger is pressed.

The method of using the invention is that the bellows member 101 is first compressed by pressure on the cocking knob 109 until the latch 110 rises behind a cross-pin 112 of the bellows rod, the condition shown in FIG. 6. The probe is then inserted into the union A of the seal under test. An air tight seal is obtained by maintaining gentle hand pressure which causes the resilient sealing sphere 105 to conform to the shape of the union.

The test is initiated by pressing the trigger 119. This causes the latch 110 to turn counterclockwise about its pivot 111 so releasing the bellows 101. The bellows member 101 then endeavours to restore to its free length. If, however, the sealing system to which the device has been connected is of limited volume and is leak-free, movement of the bellows will reduce the air pressure within the bellows and the sealing system. The difference in pressure between the interior of the bellows and the atmosphere exerts a force upon the bellows which prevents it restoring to its free length. Instead the bellows takes up a stable intermediate length at which the force resulting from the pressure differential exactly balances the force due to the strain of the bellows material. This stable position will be reached almost instanteously when the trigger 119 is pressed. The precise point of equilibrium and the resulting pressure within the bellows will be variable, depending upon the spring rate of the bellows and the volume of air within the bellows and the sealing system under test. In a specific application of the invention the bellows length recovers 75% of the compression stroke and a pressure differential of the order of 5 lbs per square inch is created between the bellows and jointing system and the atmosphere.

When the trigger is pressed and the bellows released the extremity of the trigger rod 120 simultaneously applies a force to the lower end of the reset lever 114. This rocks about its pivot causing the reset spring 113 to press against the contact spring 112 forcing it to slide on the bellows rod 106 and into contact with the end frame 107 of the device. Electrical contact is also established between the two springs, causing a signal lamp to be lit in a circuit which is not described. When the signal is noted the trigger is released and the reset lever 114 returns to its normal position under the influence of its securing spring 115. The reset contact 113 is thereby moved away from the contact spring 112 by an amount preset by the adjusting screw 118. The signal lamp is therefore extinguished.

If the sealing system under test is leak free the stable position of the bellows 101 will not change with time and the signal lamp will remain extinguished. If, however, the sealing is imperfect air will leak into the bellows member and it will continue to expand. The bellows rod 106 will therefore move to the right taking the contact spring 112 with it. Spring 112 will contact spring 113 and the signal lamp will be relit, indicating that the seal is faulty. By continuing the test for an appropriate time conformity of the quality of the sealing system to any required standard can be established. The sensitivity of the test method is controllable by adjustment of the rest position of the reset spring 113 by the adjusting screw 118. In a practical application a test time of 10 seconds is sufficient to detect very small leaks.

In a preferred arrangement release of the trigger initiates an electrical timing circuit of known type. After a pre-set time, and providing that the springs do not make contact, the circuit causes a separate "pass" lamp to light.

Although signal lamps have been referred to above they may, of course, be supplemented or replaced by audible signals of different notes.

It will be appreciated that the sensitivity of the test method which is the basis of the invention is dependent upon the residual volume of air within the bellows when compressed being small. FIG. 7 shows how this may be achieved. A filler member 123 which is made of any suitable solid material, is so dimensioned that when the bellows member is fully compressed all the space between the two ends of the bellows is occupied. Similarly, the bellows rod fills all the space within the bearing at the probe end of the bellows. The volume of air within the testing device is thus reduced to that within the fine bore of the probe and the residual volume between the convolutions of the bellows. In a typical embodiment of the invention this is less than ten cubic centimeters.

Although the device described above makes use of a reduction of pressure to test the efficacy of seals, it will be appreciated that by adding an external spring to oppose and overpower the inherent spring of the bellows member, the latter can be caused to take up the compressed position in the idle state of the device. By reversing the functions of the latch and the contact and reset springs a device which tests the efficacy of seals using a pressure increase can readily be achieved.

I claim:

1. A method of forming an annular seal between two members, comprising arranging between respective surfaces of the two members at least one sealing ring, whereby there is formed between each respective surface of each member and said at least one sealing ring a pair of acjacent lines of contact bounding a continuous groove, coupling each said continuous groove to means establishing a fluid pressure differing from the ambient pressure outside said groove, whereby different fluid pressures are established on respective sides of each of said lines of contact, and monitoring any resulting fluid flow to determine the integrity of the seals provided by said lines of contact.

2. A method as claimed in claim 1, wherein each said member is provided with a V-shaped groove defining said respective surface and said sealing ring is provided with portions of arcuate section for engagement in said grooves, whereby each said continuous groove is defined between the base of a said V-shaped groove and the arcuate section of the sealing ring engaging therein.

3. A method as claimed in claim 1, wherein each said continuous groove is formed in the respective surface of a corresponding one of said members, the cross-section of said groove being small in relation to the cross-section of said sealing ring whereby said lines of contact are formed between the lines of the groove and the sealing ring.

4. A method as claimed in claim 1, wherein each said continuous groove is formed in the surface of said sealing ring, whereby the lips of said groove form said lines of contact with the respective surface of a corresponding one of said members.

5. A method as claimed in any one of claims 2–4, wherein each said member is provided with a union for connection to said fluid pressure establishing means, said union being connected to the corresponding continuous groove.

6. A method as claimed in any one of claims 2–4, wherein one of said members is provided with a union for connection to said fluid pressure establishing means, said union being connected to the corresponding continuous groove, and said sealing ring is provided with at least one transverse bore placing the said continuous grooves in communication with one another.

7. A method as claimed in claim 6, wherein the said sealing ring is of non-circular cross-section so shaped to fit the respective surfaces of said members that said at least one transverse groove therein is maintained in alignment with said continuous groove.

* * * * *